United States Patent Office 3,247,292
Patented Apr. 19, 1966

3,247,292
MANUFACTURE OF POLYVINYL ALCOHOL GRANULES
Marc Galuzet, Lyon, France, assignor to Rhone-Poulenc S.A., Paris, France, a French body corporate
No Drawing. Filed Apr. 10, 1964, Ser. No. 358,952
Claims priority, application France, Apr. 11, 1963, 931,265
7 Claims. (Cl. 264—13)

This invention relates to the manufacture of polyvinyl alcohol granules from a gelled mass of polyvinyl alcohol.

It is known that when a polyvinyl ester is transesterified with a low molecular weight alcohol such as methanol in the presence of a catalytic amount of an alkali, a polyvinyl alcohol gel is obtained. However, it is necessary after each operation to remove the rubbery gel, which is difficult to extract from its container, in order to be able to granulate it in an appropriate manner, and this leads to supplementary manipulations and loss of time.

In order to obviate these disadvantages, processes of alcoholysis have been proposed in which the mixture of reagents is introduced into a first agitated reaction zone, then passed into an unagitated second zone in which the alcoholysis takes place, and then removed either as a viscous mass onto a travelling band on which the gelling is completed, or continuously from the reactor as a solid mass of polyvinyl alcohol using rollers. These processes have the disadvantage of leading to thick ribbons of polyvinyl alcohol which it is necessary to cut up and then grind into granules of the desired size.

It has now been found that polyvinyl alcohol granules can be obtained directly if a polyvinyl alcohol gel is extruded through orifices having a size corresponding to the size of grain desired. According, therefore, to the present invention, a process for the production of polyvinyl alcohol granules comprises extruding a polyvinyl alcohol gel formed by the alkaline alcoholysis of a polyvinyl ester through a perforated surface, and drying the granules of gel thus formed.

In order to carry out the invention, it is sufficient to mix the solution of polyvinyl ester, e.g. polyvinyl acetate, and transesterification catalyst, for example an alcoholic solution of an alkali, then to allow the polyvinyl alcohol to form a gel, and to extrude this gel. Either the mixing of the reagents and the gelling can be carried out in the same reactor, or different reactors can be used. According to one method of carrying out the invention, for example, the reagents are mixed in a first vessel and the fluid mass obtained is then rapidly transferred into a press made up of a vertical cylindrical pressure-resistant vessel having a piston fitting in its upper end and provided at the bottom with a perforated plate (which can be covered when desired). When the gelling is complete, the polyvinyl alcohol is pressed with the piston through the orifices in the perforated plate. (The gellification is considered complete when the mass is sufficiently thick for the extruded granules not to re-agglomerate into a compact mass.) Polyvinyl alcohol is thus obtained as granules by a very simple manipulation, and is then dried in a stove.

The process also makes it possible to obtain plasticized granules of polyvinyl alcohol directly if, before granulation, a suitable plasticizer is added to the reaction mass. Thus, polyvinyl alcohol granules plasticised with glycerine are obtained if glycerine is added to the other reagents when they are mixed for the alcoholysis reaction of the polyvinyl ester, and this makes possible a plasticization which is more homogeneous than if it is carried out on the granules subsequently produced.

It is evident that the form and size of the apertures in the perforated plate can be varied within large limits without modifying the nature of the invention. In general perforated plates are used having circular holes of average diameter between 1 and 20 mm., preferably 1 to 6 mm. The geometrical form of the apertures is not a critical factor in the process; they can be, for example, circular or polygonal or another geometrical form intermediate between the two.

The process can be used whatever the precise method by which the polyvinyl alcohol gel is obtained and makes it possible to obtain polyvinyl alcohols of any viscosity and having an ester index lower than 350 (corresponding to a degree of hydrolysis greater than 62% of the acyl radicals).

The process can easily be made continuous if two or more presses are used, the mixture of reagents being prepared continuously in a mixer and fed to the different presses in order.

The following examples illustrate the invention. The viscosity indexes quoted are measured according to the standard French text AFNOR T 51–013. According to this standard, the flow time ($t_0$) of a certain volume of solvent through a Ubbelhode capillary viscometer is measured, and the flow time ($t$) of the same volume of a solution of the solute in the solvent containing C g. of solute per cm.³ of solution is measured through the same viscometer. The viscosity index is then given by $$\frac{t-t_0}{Ct_0}$$

For very dilute solutions, AFNOR viscosity indexes are approximately equal to $$\frac{\text{Reduced viscosity (ASTM)}}{100}$$

*Example I*

In a vessel provided with a stirrer, three kilograms of a 20% by weight solution in methanol of polyvinyl acetate having a viscosity index of 170 are introduced. An aqueous solution of sodium hydroxide (165 g./l., 182 cc.) is run in one minute into this solution which is kept at 25° C. The mixture is agitated for a minute and then run rapidly into a vertical stainless steel cylindrical vessel 10 cm. in diameter and 60 cm. high, having its lower end closed by a metal plate 1 cm. thick perforated with 90 holes each 4 mm. in diameter. A thin, movable plate is placed underneath this perforated plate in order to close the cylindrical vessel while the gelling takes place. The reaction mass is gelled after standing for 2 minutes. The movable plate is then withdrawn and the reaction mass is forced through the holes in the perforated plate with a hydraulically operated metallic piston. The operation is carried out under a pressure of 50 bars, while the piston descends at a speed of 0.7 cm. per second. The polyvinyl alcohol is obtained in the form of granules having a mean diameter between 2 and 10 mm. After drying in a stove at 100° C., granules having a mean diameter between 1 and 5 mm. are obtained. The polyvinyl alcohol has an ester index of 5 and a viscosity of 30 centipoises, determined on a 4% solution in water at 20° C.

*Example II*

3 kilograms of a 40% by weight methanolic solution of polyvinyl acetate having a viscosity index of 30 are introduced into a vessel and a methanolic solution of sodium hydroxide (150 g./l., 75 cc.) is then added with agitation in one minute to the polyvinyl acetate solution which is maintained at 20° C. The reaction mass is stirred for two minutes and then run rapidly into the vertical cylindrical vessel described in Example I. Gelling takes place after 12 minutes. After 3 more minutes, the reaction mass is extruded by the piston under a pressure of 60 bars. The granules obtained are kept for 20 minutes at room temperature and then immersed in methanol containing a small amount of acetic acid. After 5 minutes immersion the polyvinyl alcohol granules are filtered off and then dried in an oven. The polyvinyl alcohol granules obtained have a diameter of from 1 to 5 mm., an ester index of 125 and a viscosity of 4 centipoises, determined on a 4% aqueous solution at 20° C.

*Example III*

An aqueous methanolic solution of sodium hydroxide (450 cc., containing 30 g. of sodium hydroxide and 153 g. of water per litre) is run at 25° C. and in one minute with stirring into a methanolic solution (3 kg., 45% by weight) of polyvinyl acetate having a viscosity index of 30. The mixture is stirred for 2 minutes and then run rapidly into the cylindrical vessel described in Example I. Gelling takes place after 5 minutes. After a further 3 minutes, the mass is extruded by the piston under a pressure of 60 bars. The granules obtained are allowed to stand for 25 minutes at ordinary temperature and then dried in an oven. The polyvinyl alcohol obtained has the same characteristics as that produced in Example II.

*Example IV*

Two vertical cylindrical vessels such as those described in Example I are used, the perforated plates being grills 2 cm. thick, each having 110 holes 2 mm. in diameter with anti-chambers 4 mm. in diameter and 15 mm. long. These vessels are fed continuously and in turn by a small mixer receiving simultaneously 18 kilograms per hour of a 20% by weight methanolic solution of polyvinyl acetate such as that described in Example I, and 1100 cc. per hour of an aqueous sodium hydroxide solution (165 g./l.). The mixture gels suitably five minutes after mixing.

The mixer feeds the first cylinder for ten minutes and then feeds the second cylinder. Five minutes after filling the first cylinder, the reaction mass which is contains has gelled and is extruded by the piston (duration of descent of the piston two minutes; pressure exerted by the piston 65 kg./cm.$^2$). The piston is then removed for two minutes in order to allow a new filling. The polyvinyl alcohol is obtained after drying in the form of granules having a diameter less than 2 mm. Its analytical characteristics are the same as the product of Example I.

The two cylinders work alternately in this method making continuous operation possible.

I claim:
1. Process for the manufacture of granules of polyvinyl alcohol which comprises extruding a polyvinyl alcohol gel, formed by alkaline alcoholysis of a polyvinyl ester, through a perforated surface, and drying the granules of gel thus formed.
2. Process according to claim 1 in which the granules of gel are washed with a non-solvent for polyvinyl alcohol before they are dried.
3. Process according to claim 1 in which a plasticizer for the polyvinyl alcohol is incorporated in the polyvinyl alcohol gel before it is extruded through the perforated surface.
4. Process according to claim 1 in which the polyvinyl ester is polyvinyl acetate.
5. Process according to claim 1 in which the alkaline alcoholysis is brought about with methanolic sodium hydroxide.
6. Process according to claim 1 in which the perforations in the perforated surface are 1 to 20 mm. across.
7. Process for the manufacture of granules of polyvinyl alcohol which comprises extruding a polyvinyl alcohol gel having a degree of hydrolysis greater than 62% and formed by the alkaline alcoholysis, using methanolic sodium hydroxide solution, of polyvinyl acetate, through apertures 1 to 20 mm. across, and washing and drying the granules thus formed.

References Cited by the Examiner

UNITED STATES PATENTS 2,541,165  2/1951  Kulp _____ 264—13
3,029,226  4/1962  Kesseler et al. _____ 264—176

ROBERT F. WHITE, *Primary Examiner.*